(12) United States Patent
Kook et al.

(10) Patent No.: US 10,047,831 B2
(45) Date of Patent: Aug. 14, 2018

(54) PLANETARY GEAR TRAIN OF AUTOMATIC TRANSMISSION FOR VEHICLES

(71) Applicant: Hyundai Motor Company, Seoul (KR)

(72) Inventors: Jae Chang Kook, Gyeonggi-do (KR); Seong Wook Hwang, Gyeonggi-do (KR); Woochurl Son, Gyeonggi-do (KR); Wonmin Cho, Gyeonggi-do (KR); Hyun Sik Kwon, Seoul (KR); Wookjin Jang, Gyeonggi-do (KR); Seongwook Ji, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 131 days.

(21) Appl. No.: 15/333,371

(22) Filed: Oct. 25, 2016

(65) Prior Publication Data

US 2017/0268628 A1 Sep. 21, 2017

(30) Foreign Application Priority Data

Mar. 16, 2016 (KR) .................. 10-2016-0031663

(51) Int. Cl.
*F16H 3/66* (2006.01)

(52) U.S. Cl.
CPC ....... *F16H 3/66* (2013.01); *F16H 2200/0065* (2013.01); *F16H 2200/2012* (2013.01); *F16H 2200/2046* (2013.01)

(58) Field of Classification Search
CPC .......................................................... F16H 3/66
See application file for complete search history.

(56) References Cited

U.S. PATENT DOCUMENTS

| 8,961,355 | B2 | 2/2015 | Hart et al. | |
| 2004/0048716 | A1 | 3/2004 | Ziemer | |
| 2017/0276245 | A1* | 9/2017 | Niimi | F16H 3/66 |
| 2018/0073601 | A1* | 3/2018 | Cho | F16H 3/66 |
| 2018/0087616 | A1* | 3/2018 | Raszkowski | F16H 3/66 |

FOREIGN PATENT DOCUMENTS

| KR | 10-2012-0132021 A | 12/2012 |
| WO | 2013/146028 A1 | 10/2013 |

* cited by examiner

*Primary Examiner* — Derek Douglas Knight
(74) *Attorney, Agent, or Firm* — Mintz Levin Cohn Ferris Glovsky and Popeo, P.C.; Peter F. Corless

(57) ABSTRACT

A planetary gear train of a transmission for a vehicle is provided. Nine or more forward speeds and one or more reverse speeds are achieved by a planetary gear train of an automatic transmission for a vehicle including an input shaft and an output shaft. A first planetary gear set has first, second, and third rotation elements. A second planetary gear set has fourth, fifth, and sixth rotation elements. A third planetary gear set has seventh, eighth, and ninth rotation elements. A fourth planetary gear set has tenth, eleventh, and twelfth rotation elements and eight shaft element.

8 Claims, 2 Drawing Sheets

FIG. 2

| Shift stage | Control element | | | | | | | Gear ratio |
|---|---|---|---|---|---|---|---|---|
| | C1 | C2 | C3 | B1 | B2 | B3 | | |
| D1 | | ● | | | ● | ● | | 4.493 |
| D2 | ● | ● | | ● | | ● | | 2.798 |
| D3 | ● | ● | | | | ● | | 1.950 |
| D4 | ● | | ● | | | ● | | 1.380 |
| D5 | | ● | ● | | | | | 1.000 |
| D6 | | ● | ● | ● | | | | 0.832 |
| D7 | | ● | ● | ● | | | | 0.726 |
| D8 | ● | | ● | | ● | | | 0.600 |
| D9 | ● | | | | ● | | | 0.500 |
| REV | | | | | ● | ● | | -3.900 |

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2016-0031663 filed in the Korean Intellectual Property Office on Mar. 16, 2016, the entire contents of which are incorporated herein by reference.

BACKGROUND (a) Field of the Invention

The present invention relates to an automatic transmission for a vehicle and more particularly, to a planetary gear train of an automatic transmission for a vehicle that improves a power delivery performance and enhances fuel consumption by implementing at least forward nine-speed with a reduced configuration and reduces running noise of the vehicle by utilizing a driving point in a low rotation speed range of an engine.

(b) Description of the Related Art

Generally, in an automatic transmission field research on a multistage of a gear shift stage has been conducted to enhance fuel consumption and to maximize drivability of a vehicle. In particular, an increase of the cost of oil price has resulted in requirements to enhance fuel consumption of a vehicle. Accordingly, research that reduces a weight and enhances fuel consumption of an engine has been conducted to reduce the size of the engine. For example research on an automatic transmission has been conducted to simultaneously secure drivability and fuel consumption competitive power through a multistage of a gear shift stage. However, in the automatic transmission, as a number of gear shift stage increases, the internal component number of the planetary gear set number increases. In other words, the length of the transmission increases and a mounting ability, a production cost, a weight, and power delivery efficiency may be reduced.

Therefore, in the automatic transmission, to increase a fuel consumption of the automatic transmission, an enhancement effect through a multistage of a gear shift stage requires development of a planetary gear train that induces maximum efficiency with the minimal number of required components. Accordingly, an automatic transmission implements a shift of 8-speed or greater to be mounted within a vehicle. Research and development of a planetary gear train that implements a gear shift stage of 8-speed or greater has been continuously required.

However, a general 8-speed or more of automatic transmission is typically formed with three or four planetary gear sets and five or six control elements (e.g., friction element). In other words the total length is increased and may degrade a mounting ability. To form a gear shift stage of an automatic transmission in a multistage, a double row structure that disposes a planetary gear set on a planetary gear set has been adapted or a dog clutch may be applied instead of a wet control element. However, structure may be limited and a shift feel may be degraded due to application of the dog clutch.

The above information disclosed in this section is merely for enhancement of understanding of the background of the invention and therefore it may contain information that does not form the prior art that is already known in this country to a person of ordinary skill in the art.

SUMMARY

The present invention provides a planetary gear train of an automatic transmission for a vehicle with a gear shift stage of at least forward nine-speed or more and at least reverse one-speed or more with a reduced configuration and reduces running noise of the vehicle by using a driving point in a lower rotation speed range of an engine.

An exemplary embodiment of the present invention provides a planetary gear train of an automatic transmission for a vehicle that may include an input shaft configured to receive power of an engine; an output shaft configured to output power; a first planetary gear set having first, second, and third rotation elements; a second planetary gear set having fourth, fifth, and sixth rotation elements; a third planetary gear set having seventh, eighth, and ninth rotation elements; a fourth planetary gear set having tenth, eleventh, and twelfth rotation elements; a first shaft that connects the first rotation element and the fourth rotation element and is selectively connected with the input shaft or selectively connected with a transmission housing; a second shaft that connects the second rotation element and the sixth rotation element and the seventh rotation element and the tenth rotation element; a third shaft connected with the third rotation element and selectively connected with the input shaft; a fourth shaft connected with the fifth rotation element; a fifth shaft connected with the ninth rotation element; a sixth shaft connected with the eighth rotation element and directly connected with the output shaft; a seventh shaft connected with the eleventh rotation element and directly connected with the input shaft; and an eighth shaft connected with the twelfth rotation element and selectively connected with the sixth shaft.

The fourth shaft and the fifth shaft each may be selectively connected with a transmission housing. The first, second, and third rotation elements of the first planetary gear set may be a first sun gear, a first planetary carrier, and a first ring gear, respectively. The fourth, fifth, and sixth rotation elements of the second planetary gear set may be a second sun gear, a second planetary carrier, and a second ring gear, respectively. The seventh, eighth, and ninth rotation elements of the third planetary gear set may be a third sun gear, a third ring gear, and a third planetary carrier, respectively, and the tenth, eleventh. The twelfth rotation elements of the fourth planetary gear set may be a fourth sun gear, a fourth planetary carrier, a fourth ring gear, respectively.

The planetary gear train may further include a first clutch that selectively connects the first shaft and the input shaft, a second clutch that selectively connects the third shaft and the input shaft, a third clutch that selectively connects the sixth shaft and the eighth shaft, a first brake that selectively connects the first shaft and the transmission housing, a second brake that selectively connects the fourth shaft and the transmission housing and a third brake that selectively connects the fifth shaft and the transmission housing.

Accordingly, by combining four planetary gear sets that are formed with a simple planetary gear set with six control elements, a gear shift stage of at least forward nine-speed or more and a gear shift stage of at least reverse one-speed or more may be implemented. Further, according to the present invention, by forming a gear shift stage of an automatic transmission in a multistage, a gear shift stage appropriate to a rotation speed of an engine may be implemented. In particular, running noise of a vehicle may be reduced by utilizing a driving point in a lower rotation speed range of the engine. Further, according to the present invention, engine driving efficiency may be maximized with a high efficiency multistage, and a power delivery performance and fuel consumption may be improved.

In addition, an effect that may be obtained or estimated due to an exemplary embodiment of the present invention is directly or implicitly described in a detailed description of an exemplary embodiment of the present invention. That is, various effects that are estimated according to an exemplary embodiment of the present invention will be described within a detailed description to be described later.

BRIEF DESCRIPTION OF THE DRAWINGS

The above and other objects, features and other advantages of the present invention will be more clearly understood from the following detailed description when taken in conjunction with the accompanying drawings, in which:

FIG. 2 is an exemplary table illustrating operation on a gear shift stage basis of a control element that is applied to a planetary gear train according to an exemplary embodiment of the present invention.

DETAILED DESCRIPTION

Figure 1:
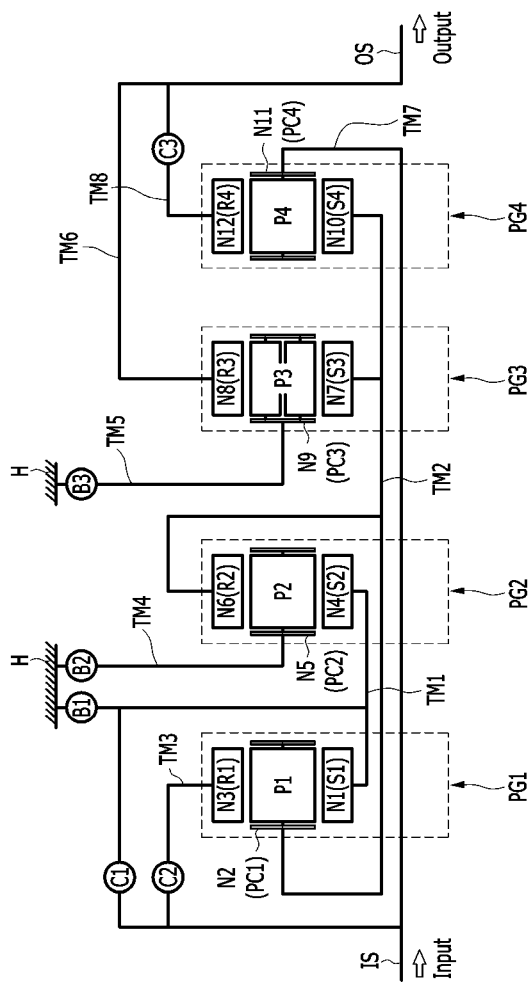
FIG. 1 is an exemplary schematic diagram illustrating a planetary gear train according to an exemplary embodiment of the present invention.

Hereinafter, an exemplary embodiment of the present invention will be described in detail with reference to the accompanying drawings. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed there between.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

FIG. 1 is an exemplary schematic diagram illustrating a planetary gear train according to an exemplary embodiment of the present invention. Referring to FIG. 1, a planetary gear train according to an exemplary embodiment of the present invention may include first, second, third, and fourth planetary gear sets PG1, PG2, PG3, and PG4 disposed on the same shaft line, an input shaft IS, an output shaft OS, eight shafts TM1-TM8 connected with each rotation element of the first, second, third, and fourth planetary gear sets PG1, PG2, PG3, and PG4, three clutches C1-C3 and three brakes B1-B3, which are a control element, and a transmission housing H.

Rotation power from an engine input from the input shaft IS may be shifted by a mutual compensation operation of the first, second, third, and fourth planetary gear sets PG1, PG2, PG3, and PG4 to be output through the output shaft OS. For example, the planetary gear sets may be disposed in order of the first, second, third, and fourth planetary gear sets PG1, PG2, PG3, and PG4 from the engine side. The input shaft IS may be an input member, and a torque of rotation power from a crankshaft of the engine may be converted and input using a torque converter. The output shaft OS may be an output member and may be disposed on the same shaft line as that of the input shaft IS to deliver a shifted driving torque to a drive shaft using a differential apparatus.

The first planetary gear set PG1 may be a single pinion planetary gear set and may include a first sun gear S1, which is a first rotation element N1, a first planetary carrier PC1, which is a second rotation element N2 configured to support a rotation of a first pinion gear P1 externally engaged with the first sun gear S1, which is the first rotation element N1, and a first ring gear R1, which is a third rotation element N3 internally engaged with the first pinion gear P1. The second planetary gear set PG2 may be a single pinion planetary gear set and may include a second sun gear S2, which is a fourth rotation element N4, a second planetary carrier PC2, which is a fifth rotation element N5 to support a rotation of a second pinion gear P2 that may be externally engaged with the second sun gear S2, which is the fourth rotation element N4, and a second ring gear R2, which is a sixth rotation element N6 that may be internally engaged with the second pinion gear P2.

The third planetary gear set PG3 may be a double pinion planetary gear set and may include a third sun gear S3, which is a seventh rotation element N7, a third ring gear R3, which is an eighth rotation element N8 internally engaged with an external pinion of a pair of third pinions P3 that externally engaged with the third sun gear S3, which is the seventh rotation element N7, and a third planetary carrier PC3, which is a ninth rotation element N9 that to support the third pinion P3 that may be externally engaged with the third sun gear S3, which is the seventh rotation element N7. The fourth planetary gear set PG4 may be a single pinion planetary gear set and may include a fourth sun gear S4, which is a tenth rotation element N10, a fourth planetary carrier PC4, which is an eleventh rotation element N11 to support a rotation of a fourth pinion gear P4 that may be externally engaged with the fourth sun gear S4, which is the tenth rotation element N10, and a fourth ring gear R4, which is a twelfth rotation element N12 that may be internally engaged with the fourth pinion gear P4.

Further, in the first, second, third, and fourth planetary gear sets PG1, PG2, PG3, and PG4, the first rotation element N1 may be directly connected with the fourth rotation element N4. The second rotation element N2 may be directly connected with the sixth rotation element N6, the seventh rotation element N7, and the tenth rotation element N10. The first, second, third, and fourth planetary gear sets PG1, PG2, PG3, and PG4 may be configured to operate while holding total eight shafts TM1-TM8.

A configuration of the eight shafts TM1-TM8 is described in detail as follows. The eight shafts TM1-TM8 may be a rotation member that delivers power while rotating together with a rotation element that may be connected to directly connect or to selectively connect a plurality of rotation elements among rotation elements of the planetary gear sets PG1, PG2, PG3, and PG4 and may be a fixing member that may directly connect and fixes the rotation element to the transmission housing H.

The first shaft TM1 may directly connect the first rotation element (e.g., N1; first sun gear S1) and the fourth rotation element (e.g., N4; second sun gear S2) and may be configured to operate as a selective input element while being selectively connected with the input shaft IS or may be configured to operate as a selective fixing element while being selectively connected with the transmission housing H. The second shaft TM2 may directly connect the second rotation element (e.g., N2; first planetary carrier PC1), the sixth rotation element (e.g., N6; second ring gear R2), the seventh rotation element (e.g., N7; third sun gear S3), and the tenth rotation element (e.g., N10; fourth sun gear S4).

The third shaft TM3 may be directly connected with the third rotation element (e.g., N3; first ring gear R1) and may operate as a selective input element while being selectively connected with the input shaft IS. The fourth shaft TM4 may be directly connected with the fifth rotation element (e.g., N5; second planetary carrier PC2) and may operate as a selective input element while being selectively connected with the transmission housing H. The fifth shaft TM5 may be directly connected with the ninth rotation element (e.g., N9; third planetary carrier PC3) and may operate as a selective input element while being selectively connected with the transmission housing H.

The sixth shaft TM6 may be directly connected with the eighth rotation element (e.g., N8; third ring gear R3) and may be directly connected with the output shaft OS to operate as an output element. The seventh shaft TM7 may be directly connected with the eleventh rotation element (e.g., N11; fourth planetary carrier PC4) and may be directly connected with the input shaft IS to operate as an input element. The eighth shaft TM8 may be directly connected with the twelfth rotation element (e.g., N12; fourth ring gear R4) and may be selectively connected with the sixth shaft TM6.

Among the eight shafts TM1-TM8, in a portion including the input shaft IS and the output shaft OS and that mutually selectively connects shafts, three clutches C1, C2, and C3 may be disposed. Further, among the eight shafts TM1-TM8, in a portion in which the shaft and the transmission housing H are selectively connected, three brakes B1, B2, and B3 may be disposed. In other words, a disposition location of the three clutches C1-C3 and three brakes B1-B3 is described as follows. The first clutch C1 may be disposed between the input shaft IS and the first shaft TM1 to selectively connect the input shaft IS and the first shaft TM1 to generate power. The second clutch C2 may be disposed between the input shaft IS and the third shaft TM3 to selectively connect the input shaft IS and the third shaft TM3 to generate power. The third clutch C3 may be disposed between the sixth shaft TM6 and the eighth shaft TM8 to selectively connect the sixth shaft TM6 and the eighth shaft TM8 to generate power.

The first brake B1 may be disposed between the first shaft TM1 and the transmission housing H to selectively connect and fix the first shaft TM1 to the transmission housing H. The second brake B2 may be disposed between the fourth shaft TM4 and the transmission housing H to selectively connect and fix the fourth shaft TM4 to the transmission housing H. The third brake B3 may be disposed between the fifth shaft TM5 and the transmission housing H to selectively connect and fix the fifth shaft TM5 to the transmission housing H. In the foregoing description, each control element may be formed with the first, second, and third clutches C1, C2, and C3 and the first, second, and third brakes B1, B2, and B3 may be formed with a multiplate type hydraulic pressure friction coupling unit that is friction coupled by a hydraulic pressure.

FIG. 2 is an exemplary table illustrating operation on each gear shift stage basis of a control element that may be applied to a planetary gear train according to an exemplary embodiment of the present invention. Referring to FIG. 2, in each gear shift stage of the planetary gear train according to an exemplary embodiment of the present invention, among the first, second, and third clutches C1, C2, and C3 and the first, second, and third brakes B1, B2, and B3, which are a control element, while three elements operate, a shift of reverse one-speed and forward nine-speed may be performed, and a shift process is described as follows.

In a forward one-speed gear shift stage D1, the second clutch C2 and the second and third brakes B2 and B3 may be operated simultaneously with a gear ratio of about 4.493. Accordingly when the third shaft TM3 is connected with the input shaft IS by operation of the second clutch C2, rotation power of the input shaft IS may be input to the third and seventh shafts TM3 and TM7. The fourth and fifth shafts TM4 and TM5 may be shifted to a forward one-speed by a mutual compensation operation of each shaft while operating as a fixing element by operation of the second and third brakes B2 and B3 may be configured to output power through the output shaft OS connected with the sixth shaft TM6.

In a forward two-speed gear shift stage D2, the second clutch C2 and the first and third brakes B1 and B3 may be operated simultaneously operated with a gear ratio of about 2.798. Accordingly, when the third shaft TM3 is connected with the input shaft IS by operation of the second clutch C2, rotation power of the input shaft IS may be input to the third and seventh shafts TM3 and TM7. The first and fifth shafts TM1 and TM5 may be shifted to a forward two-speed by a mutual compensation operation of each shaft while operating as a fixing element by operation of the first and third brakes B1 and B3 may be configured to output power through the output shaft OS connected with the sixth shaft TM6.

In a forward three-speed gear shift stage D3, the first and second clutches C1 and C2 and the third brake B3 may be operated simultaneously with a gear ratio of about 1.950. Accordingly, when the first shaft TM1 is connected with the input shaft IS by operation of the first clutch C1 and when the third shaft TM3 is connected with the input shaft IS by operation of the second clutch C2, rotation power of the input shaft IS may be input to the first, third, and seventh shafts TM1, TM3, and TM7. The fifth shaft TM5 may be shifted to a forward three-speed by a mutual compensation operation of each shaft while operating as a fixing element by operation of the third brake B3 may be configured to output power through the output shaft OS connected with the sixth shaft TM6.

In a forward four-speed gear shift stage D4, the first and third clutches C1 and C3 and the third brake B3 may be operated simultaneously with a gear ratio of about 1.380. Accordingly, when the first shaft TM1 is connected with the input shaft IS by operation of the first clutch C1 and when the sixth shaft TM6 is connected with the eighth shaft TM8 by operation of the third clutch C3, rotation power of the input shaft IS may be input to the first and seventh shafts TM1 and TM7. The fifth shaft TM5 may be shifted to a forward four-speed by a mutual compensation operation of each shaft while operating as a fixing element by operation of the third brake B3 may be configured to output power through the output shaft OS connected with the sixth shaft TM6.

In a forward five-speed gear shift stage D5, the first, second, and third clutches C1, C2, and C3 may be simultaneously with a gear ratio of about 1.000. Accordingly, when the first shaft TM1 is connected with the input shaft IS by operation of the first clutch C1 and when the third shaft TM3 is connected with the input shaft IS by operation of the second clutch C2 and when the sixth shaft TM6 is connected with the eighth shaft TM8 by operation of the third clutch C3, rotation power of the input shaft IS may be input to the first, third, and seventh shafts TM1, TM3, and TM7. Accordingly, when first, second, third, and fourth planetary gear sets PG1, PG2, PG3, and PG4 integrally rotate, the first, second, third, and fourth planetary gear sets PG1, PG2, PG3, and PG4 may be shifted to a forward five-speed that may be configured to output a similar value as an input value to output power through the output shaft OS connected with the sixth shaft TM6.

In a forward six-speed gear shift stage D6, the second and third clutches C2 and C3 and the first brake B1 may be simultaneously operated with a gear ratio of 0.832. Accordingly, when the third shaft TM3 is connected with the input shaft IS by operation of the second clutch C2 and when the sixth shaft TM6 is connected with the eighth shaft TM8 by operation of the third clutch C3, rotation power of the input shaft IS may be input to the third and seventh shafts TM3 and TM7. The first shaft TM1 may be shifted to a forward six-speed by a mutual compensation operation of each shaft when configured to operate as a fixing element by adjustment of the first brake B1 to output power through the output shaft OS connected with the sixth shaft TM6.

In a forward seven-speed gear shift stage D7, the second and third clutches C2 and C3 and the second brake B2 may be operated simultaneously with a gear ratio of about 0.726. Accordingly, when the third shaft TM3 is connected with the input shaft IS by operation of the second clutch C2 and when the sixth shaft TM6 is connected with the eighth shaft TM8 by operation of the third clutch C3, rotation power of the input shaft IS may be input to the third and seventh shafts TM3 and TM7. The fourth shaft TM4 may be shifted to a forward seven-speed by a mutual compensation operation of each shaft when configured to operate as a fixing element by operation of the second brake B2 that may be configured to output power through the output shaft OS connected with the sixth shaft TM6.

In a forward eight-speed gear shift stage D8, the third clutch C3 and the first and second brakes B1 and B2 may be operated simultaneously with a gear ratio of about 0.600. Accordingly, when the sixth shaft TM6 is connected with the eighth shaft TM8 by operation of the third clutch C3, rotation power of the input shaft IS may be input to the seventh shaft TM7. The first and fourth shafts TM1 and TM4 may be shifted to a forward eight-speed by a mutual compensation operation of each shaft while simultaneously operating as a fixing element by operation of the first and second brakes B1 and B2 that may be configured to output power through the output shaft OS connected with the sixth shaft TM6.

In a forward nine-speed gear shift stage D9, the first and third clutches C1 and C3 and the second brake B2 may be operated simultaneously with a gear ratio of about 0.500. Accordingly, when the first shaft TM1 is connected with the input shaft IS by operation of the first clutch C1 and when the sixth shaft TM6 is connected with the eighth shaft TM8 by operation of the third clutch C3, rotation power of the input shaft IS may be input to the first and seventh shafts TM1 and TM7. The fourth shaft TM4 may be shifted to a forward nine-speed by a mutual compensation operation of each shaft while operating as a fixing element by operation of the second brake B2 that may be configured to output power through the output shaft OS connected with the sixth shaft TM6.

In a reverse shift stage REV, the first clutch C1 and the second and third brakes B2 and B3 may be operated simultaneously operated with a gear ratio of about −3.900. Accordingly, when the first shaft TM1 is connected with the input shaft IS by operation of the first clutch C1, rotation power of the input shaft IS may be input to the first and seventh shafts TM1 and TM7. The fourth and fifth shafts TM4 and TM5 may be shifted to the reverse by a mutual compensation operation of each shaft while operating as a fixing element by operation of the second and third brakes B2 and B3 that may be configured to output power through the output shaft OS connected with the sixth shaft TM6.

As described above, a planetary gear train according to an exemplary embodiment of the present invention may be configured to operate four planetary gear sets PG1, PG2, PG3, and PG4 to realize a gear shift stage of at least forward nine-speed or more and at least reverse one-speed or more by an adjustment of three clutches C1, C2, and C3 and three brakes B1, B2, and B3.

Additionally, by forming a gear shift stage of an automatic transmission in a multistage, a planetary gear train according to an exemplary embodiment of the present invention may implement a gear shift stage appropriate to a rotation speed of an engine and may improve running silence of a vehicle by using a driving point in a low rotation speed range of the engine. Further, by forming an automatic transmission in a multistage, a planetary gear train according to an exemplary embodiment of the present invention may maximize engine driving efficiency and improve a power delivery performance and fuel consumption.

While this invention has been described in connection with what is presently considered to be 1 exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A planetary gear train of an automatic transmission for a vehicle, comprising:
an input shaft configured to receive power of an engine;
an output shaft configured to output power;

a first planetary gear set having first, second, and third rotation elements;
a second planetary gear set having fourth, fifth, and sixth rotation elements;
a third planetary gear set having seventh, eighth, and ninth rotation elements;
a fourth planetary gear set having tenth, eleventh, and twelfth rotation elements;
a first shaft connected with the first rotation element and the fourth rotation element and selectively connected with the input shaft or selectively connected with a transmission housing;
a second shaft connected the second rotation element and the sixth rotation element and the seventh rotation element and the tenth rotation element;
a third shaft connected with the third rotation element and selectively connected with the input shaft;
a fourth shaft connected with the fifth rotation element;
a fifth shaft connected with the ninth rotation element;
a sixth shaft connected with the eighth rotation element and directly connected with the output shaft;
a seventh shaft connected with the eleventh rotation element and directly connected with the input shaft; and
an eighth shaft connected with the twelfth rotation element and selectively connected with the sixth shaft.

2. The planetary gear train of claim 1, wherein the fourth shaft and the fifth shaft each are selectively connected with a transmission housing.

3. The planetary gear train of claim 1, wherein:
the first, second, and third rotation elements of the first planetary gear set are a first sun gear, a first planetary carrier, and a first ring gear, respectively,
the fourth, fifth, and sixth rotation elements of the second planetary gear set are a second sun gear, a second planetary carrier, and a second ring gear, respectively,
the seventh, eighth, and ninth rotation elements of the third planetary gear set are a third sun gear, a third ring gear, and a third planetary carrier, respectively, and
the tenth, eleventh, and twelfth rotation elements of the fourth planetary gear set are a fourth sun gear, a fourth planetary carrier, a fourth ring gear, respectively.

4. The planetary gear train of claim 2, further comprising:
a first clutch that selectively connects the first shaft and the input shaft;
a second clutch that selectively connects the third shaft and the input shaft;
a third clutch that selectively connects the sixth shaft and the eighth shaft;
a first brake that selectively connects the first shaft and the transmission housing;
a second brake that selectively connects the fourth shaft and the transmission housing; and
a third brake that selectively connects the fifth shaft and the transmission housing.

5. A planetary gear train of an automatic transmission for a vehicle, comprising:
an input shaft configured to receive power of an engine;
an output shaft configured to output power;
a first planetary gear set having first, second, and third rotation elements;
a second planetary gear set having fourth, fifth, and sixth rotation elements;
a third planetary gear set having seventh, eighth, and ninth rotation elements; and
a fourth planetary gear set having tenth, eleventh, and twelfth rotation elements,
wherein the input shaft is directly connected with the eleventh rotation element, the output shaft is directly connected with the eighth rotation element,
wherein the first rotation element is directly connected with the fourth rotation element and is selectively connected with the input shaft or is selectively connected with the transmission housing,
wherein the second rotation element is directly connected with the sixth rotation element, the seventh rotation element, and the tenth rotation element,
wherein the third rotation element is selectively connected with the input shaft, and
wherein the twelfth rotation element is selectively connected with the eighth rotation element.

6. The planetary gear train of claim 5, wherein the fifth rotation element and the ninth rotation element each are selectively connected with a transmission housing.

7. The planetary gear train of claim 5,
wherein the first, second, and third rotation elements of the first planetary gear set are a first sun gear, a first planetary carrier, and a first ring gear, respectively,
wherein the fourth, fifth, and sixth rotation elements of the second planetary gear set are a second sun gear, a second planetary carrier, and a second ring gear, respectively, wherein the seventh, eighth, and ninth rotation elements of the third planetary gear set are a third sun gear, a third ring gear, and a third planetary carrier, respectively, and
wherein the tenth, eleventh, and twelfth rotation elements of the fourth planetary gear set are a fourth sun gear, a fourth planetary carrier, and a fourth ring gear, respectively.

8. The planetary gear train of claim 6, further comprising:
a first clutch that selectively connects the first rotation element and the input shaft;
a second clutch that selectively connects the third rotation element and the input shaft;
a third clutch that selectively connects the eighth rotation element and the twelfth rotation element;
a first brake that selectively connects the first rotation element and the transmission housing;
a second brake that selectively connects the fourth rotation element and the transmission housing; and
a third brake that selectively connects the fifth rotation element and the transmission housing.

* * * * *